(12) United States Patent
Fell et al.

(10) Patent No.: US 6,848,305 B2
(45) Date of Patent: Feb. 1, 2005

(54) VIBRATORY GYROSCOPIC RATE SENSOR

(75) Inventors: Christopher P Fell, Plymouth (GB); Rebecka Eley, Plymouth (GB); Colin H. J. Fox, Nottingham (GB); Stewart McWilliam, Nottingham (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/475,562

(22) PCT Filed: Sep. 6, 2002

(86) PCT No.: PCT/GB02/04057
§ 371 (c)(1),
(2), (4) Date: Oct. 22, 2003

(87) PCT Pub. No.: WO03/025504
PCT Pub. Date: Mar. 27, 2003

(65) Prior Publication Data
US 2004/0134279 A1 Jul. 15, 2004

(30) Foreign Application Priority Data
Sep. 14, 2001 (GB) .............................. 0122253

(51) Int. Cl.$^7$ ................................................. G01P 9/04
(52) U.S. Cl. .................................................. 73/504.13
(58) Field of Search ......................... 73/504.13, 504.12, 73/504.02

(56) References Cited

U.S. PATENT DOCUMENTS

| 5,226,321 A | 7/1993 | Varnham et al. |
| 5,817,940 A | 10/1998 | Kobayashi et al. |
| 5,915,276 A | 6/1999 | Fell |
| 5,932,804 A | 8/1999 | Hopkin et al. |
| 6,089,090 A | 7/2000 | Namerikawa et al. |
| 6,151,964 A | 11/2000 | Nakajima |
| 6,272,925 B1 | 8/2001 | Watson |
| 6,282,958 B1 | 9/2001 | Fell et al. |
| 6,343,509 B1 | 2/2002 | Fell et al. |
| 6,401,534 B1 | 6/2002 | Fell et al. |

FOREIGN PATENT DOCUMENTS

| EP | 0 619 471 | 10/1994 |
| EP | 0 836 073 A | 4/1998 |
| EP | 0 859 219 | 8/1998 |
| GB | 2318184 A | 4/1998 |
| GB | 2 322 196 | 8/1998 |
| GB | 2 335 273 | 9/1999 |
| GB | 2338781 A | 12/1999 |
| WO | 99/22203 A | 5/1999 |
| WO | 99/47890 A | 9/1999 |
| WO | 99/47891 A | 9/1999 |
| WO | 00/09971 | 2/2000 |
| WO | 01/53776 A | 7/2001 |
| WO | 01/55675 A | 8/2001 |

*Primary Examiner*—John E. Chapman
(74) *Attorney, Agent, or Firm*—Nixon & Vanderhye P.C.

(57) ABSTRACT

A three axis sensor including a substantially planar vibrator resonator or having a substantially ring or hoop like structure with inner and outer peripheries e tending around a common axis, drive means for causing the resonator to vibrate in an in lane cos 2θ vibration mode, carrier mode pick-off means for sensing movement of the resonator in response to said drive means, pick-off means for sensing in plane sin 2θ resonator motion induced by rotation about the z-axis, drive means for nulling said motion, pick-off means for sensing out of plane sin 3θ resonator motion induced by rotation about the x-axis, drive means for nulling said motion, pick-off means for sensing out of plane cos 3θ resonator motion induced by rotation about the y-axis, drive means for nulling said motion, and support means for flexibly supporting the resonator and for allowing the resonator to vibrate relative to the support means in response to the drive means and to applied rotations, wherein the support means comprises only L support beams, where $L \neq 2^J \times 3^K$ and $J=0$, 1 or 2 and $K=0$ or 1 with $L<24$.

20 Claims, 5 Drawing Sheets

VIBRATORY GYROSCOPIC RATE SENSOR

This application is the US national phase of international application PCT/GB02/04057, filed 6 Sep. 2002, which designated the US. PCT/GB02/04057 claims priority to GB Application No. 0122253.8, file 14 Sep. 2001. The entire contents of these applications are incorporated herein b reference.

This invention relates to rate sensors for sensing applied rate on three axes.

Figure 1A:
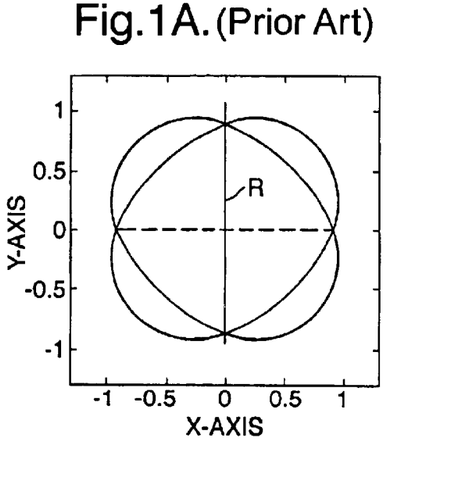
FIGS. 1A and 1B show in plane sin 2θ and cos 2θ modes.
Figure 1B:
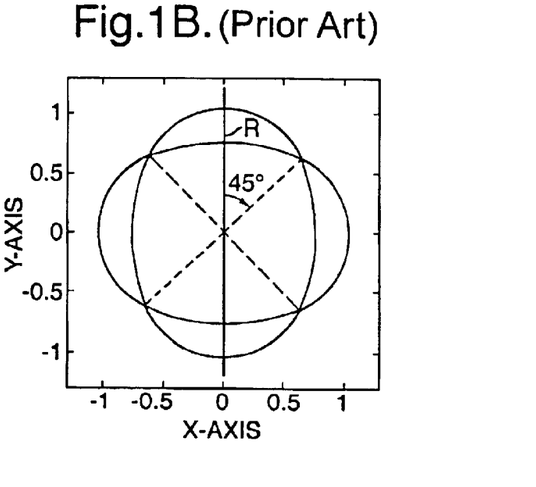
Figure 3A:
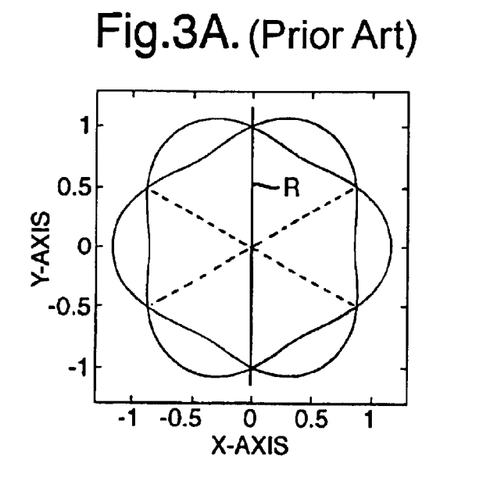
FIGS. 3A and 3B show in plane sin 3θ and cos 3θ modes.
Figure 3B:
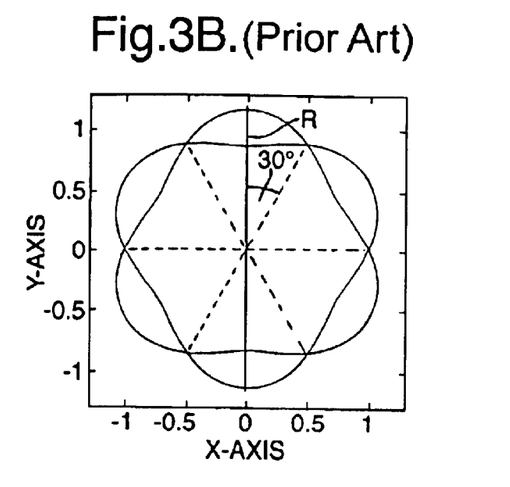
Figure 4A:
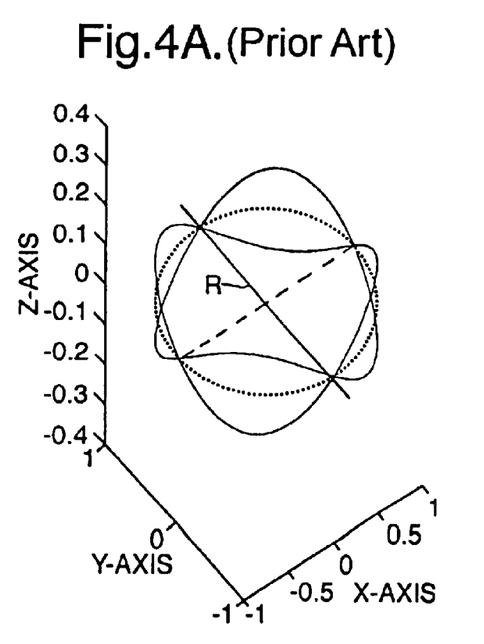
FIGS. 4A and 4B show out of plane sin 2θ and cos 2θ mode.
Figure 4B:
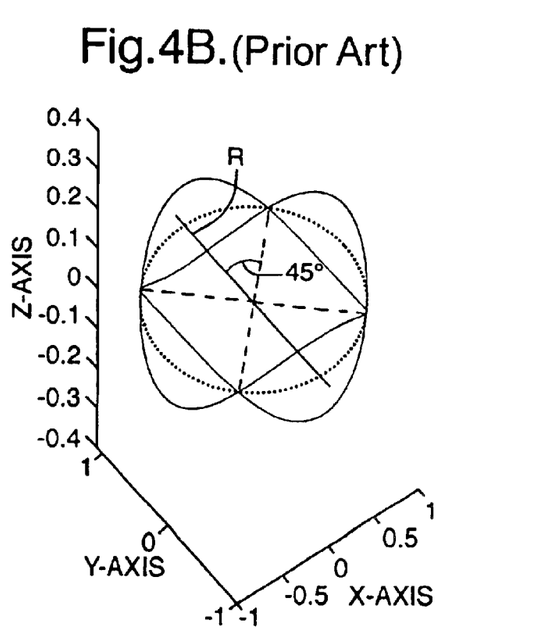

The use of planar ring shaped resonators in Coriolis rate sensors is well known. GB 9620982.0 describes such a device which makes use of a pair of in plane sin2θ/cos2θ vibration modes, as shown in FIGS. 1A and 1B, in combination with a pair of out of plane sin3θ/cos3θ, shown in FIGS. 2A and 2B. The in plane cos 2θ mode is excited as the carrier mode which is typically maintained at a fixed vibration amplitude. When the device is rotated around the axis normal to the plane of the ring (z-axis), Coriolis forces are induced which couple energy into the complementary in plane sin 2θ mode. When the device is rotated about the y-axis in the plane of the ring, Coriolis forces are induced which couple energy in the out of plane cos 3θ response mode. When the device is rotated about the x-axis in the plane of the ring, Coriolis forces are induced which couple energy in the out of plane sin 3θ response mode. The amplitude of the induced response mode motions is directly proportional to the applied rotation rates about the appropriate input axes. GB 9620982.0 also describes a three axis rate sensor device which makes use of a pair of in plane sin 3θ/cos 3θ vibration modes, as shown in FIGS. 3A and 3B, in combination with a pair of out of plane sin 2θ/cos 2θ, shown in FIGS. 4A and 4B. The in plane cost 3θ mode is excited as the carrier mode which is typically maintained at a fixed vibration amplitude. When the device is rotated around the axis normal to the plane of the ring (z-axis), Coriolis forces are induced which couple energy into the complementary in plane sin 3θ mode. When the device is rotated about the y-axis in the plane of the ring, Coriolis forces are induced which couple energy in the out of plane cos 2θ response mode. When the device is rotated about the x-axis in the plane of the ring, Coriolis forces are induced which couple energy in the out of plane sin 2θ response mode. The amplitude of the induced response mode motions is directly proportional to the applied rotation rates about the appropriate input axes.

For these devices, the carrier and the three response mode frequencies are required to be nominally identical. With these frequencies accurately matched the amplitude of the response mode vibration is amplified by the mechanical quality factor, Q, of the structure. This inevitably makes the construction tolerances more stringent. In practice, it may be necessary to fine-tune the balance of the vibrating structure or resonator for instance by adding or removing material at appropriate points. This adjusts the stiffness or mass parameters for the modes and thus differentially shifts the mode frequencies. Where these frequencies are not matched the Q amplification does not occur and the pick-offs must be made sufficiently sensitive to provide adequate gyroscope performance.

For a perfect unsupported ring structure fabricated from radially isotropic material, any given pair of in or out of plane sin N/cos N modes will have identical frequencies for any value of N. Where N is the mode order. This degeneracy may be perturbed due to the requirement for the leg structures which support the ring. In the three axis rate sensor designs of the prior art, for an appropriate configuration of support legs, the number and spacing of the support legs is such that the symmetry of both the in plane and the out of plane sin Nθ/cos Nθ modes is maintained. This has hitherto been achieved using a number of legs conforming to the following rule:

$$L = N \times N_i \times 4$$

where N is the in plane mode order and $N_i$ is the out of plane mode order. When using a combination of sin 2/cos 2θ and sin 3θ/cos 3θ modes this indicates a requirement for 24 equi-angularly spaced legs. The resonator dimensions are set in order to match the frequency of the in plane mode pair to that of the out of plane mode pair.

Figure 5A:
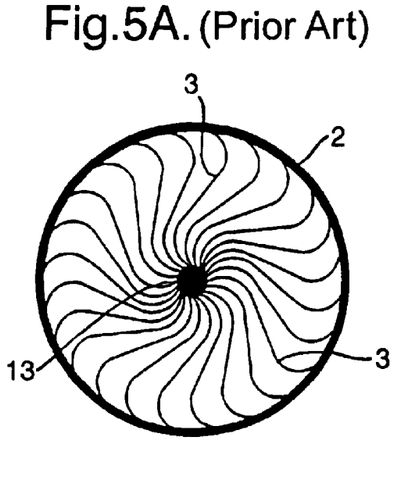
FIGS. 5A and 5B show two possible 24 support leg configurations according to the prior art.
Figure 5B:
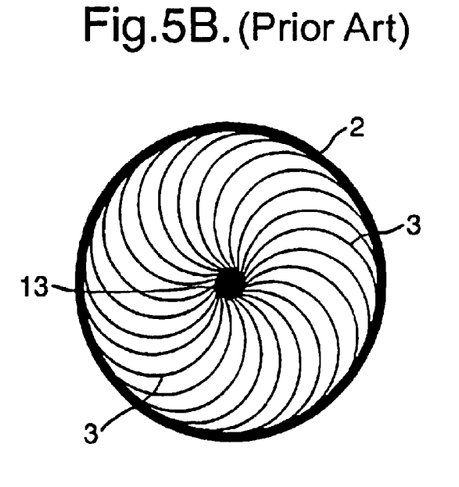

These leg structures are required to suspend the ring but must also allow it to vibrate in an essentially undamped oscillation for both in and out of plane vibrations. The total stiffness of the legs when subjected to in plane and out of plane motions must be significantly less than that of the ring itself so that the modal vibration is dominated by the ring structure. In order to achieve the required compliance ratio the legs need to be considerably thinner than the ring rim width. FIGS. 5A & 5B show two suitable support leg arrangements taken from GB 9620982.0 which use twenty-four legs. In this arrangement S or C shaped legs 3 are provided which extend from a central boss 13 outwards to the inner periphery of the ring 2. These legs are required to be compliant to the in plane radial and tangential motion and also to out of plane motion. It will be understood by those skilled in the art that other variations to the detailed leg design are possible which achieve the same purpose. These include the use of external leg supports which extend radially from the outer periphery of the ring to an external support frame (not shown). This reduced dimension renders these structures more susceptible to the effects of dimensional tolerancing in the production processes of the mechanical sire. This will result in variation in the mass and stiffness of these supporting leg elements which will perturb the symmetry of the mode dynamics and hence Induce undesirable frequency splitting of the both the in and out of plane mode pairs.

WO-A-0153770 discloses a vibratory sensor operating as a multi axis gyroscope using a vibratory planar ring resonator. It does not address requirements for support means for the resonator.

EP-A-0836 073 describes two and three axes applied rate sensors using a vibratory planar ring resonator supported on flexible legs but operating with cos 2θ in plane modes in combination with 1θ out of plane rocking modes.

WO-A-99 47890 discloses a multi axes rate sensing gyroscope employing a vibratory ring resonator supported on flexible legs operating in Cos 2θ/Cos 3θ vibration modes. It does not address specific requirements for leg numbers.

The structures described in the prior art may be fabricated in a variety of materials using a number of processes. Where such devices are fabricated from metal these may be conveniently machined to high precision using wire erosion techniques to achieve the accurate dimensional tolerancing required. This process involves sequentially machining away material around the edges of each leg and the ring sure. The machining time, and hence production costs, increases in proportion to the number of legs. Minimising the number of legs is therefore highly beneficial. Similar considerations apply to structures fabricated from other material using alternative processes.

It would be desirable to be able to design planar ring structures which require a reduced number of support legs but without affecting the vibration of the ring structure to any grater extent from the prior art arrangements having a relatively large number of support legs.

According to a first aspect of the present invention there is provided a three axis sensor including a substantially planar vibratory resonator having a substantially ring or hoop like structure with inner and outer peripheries extending around a common axis, drive means for causing the resonator to vibrate in an in plane cos 2θ vibration mode, carrier mode pick-off means for sensing movement of the resonator in response to said drive means, pick-off means for sensing in plane sin 2θ resonator motion induced by rotation about the z-axis, drive means for nulling said motion, pick-off means for sensing out of plane sin 3θ resonator motion induced by rotation about the x-axis drive means for nulling said motion, pick-off means for sensing out of plane cos 3θ resonator motion induced by rotation about the y-axis, drive means for nulling said motion, and support means for flexibly supporting the resonator and for allowing the resonator to vibrate relative to the support means in response to the drive means and to applied rotation, characterised In that the support means comprises only L support beams, where $L \neq 2^J \times 3K$ and $J=0, 1$ or $2$ and $K=0$ or $1$ with $L<24$. For example there may be five or seven support beams.

According to a second aspect of the present invention there is provided a three axis sensor including a substantially planar vibratory resonator having a substantially zing or hoop like structure with inner and outer peripheries extending around a common axis, drive means for causing the resonator to vibrate in an in plane cos 3θ vibration mode, carrier mode pick-off means for sensing movement of the resonator in response to said drive means, pick-off means for sensing in plane sin 3θ resonator motion induced by rotation about the z-axis, drive means for nulling said motion, pick-off means for sensing out of plane sin 2θ resonator motion induced by rotation about the x-axis, drive means for nulling said motion, pick-off means for sensing out of plane cos 2θ resonator motion induced by rotation about the y-axis, drive means for nulling said motion, pick off means for sensing out of plane Sin 2θ resonator motion induced by rotation around the x-axis, drive means for nulling said motion, and support means for flexibly supporting the resonator and for allowing the resonator to vibrate relative to the support means in response to the drive means and to applied rotations, characterised in that the support means comprises only L support beams, where $L \#2^J \times 3^K$ and $J=0, 1$ or $2$ and $K=0$ or $1$ with $L<24$. For example, there may be five or seven support beams.

Each support means is a beam comprising first and sand linear portions extending from opposite ends of an arcuate portion.

In the embodiment, the support beams are substantially equi-angularly spaced.

Conveniently, the support means includes a base having a projecting boss, with the inner periphery of the substantially ring or hoop-like structure being coupled to the boss by the support beams which extend from the inner periphery of the ring or hoop-like structure to the projecting boss so that the ring or hoop-like structure of the resonator is spaced from a base.

In the embodiment, the total stiffness of the support means is less than that of the ring or hoop-like structure.

The formulae defined above have been obtained as a result of a detailed analysis of the dynamics of the ring or hooplike structure including the effects of leg motion. The present invention may provide increased design flexibility allowing greater leg compliance (relative to the ring) whilst employing increased leg dimensions (in the plane of the ring). Such designs may exhibit reduced sensitivity to dimensional tolerancing effects and allow more economical fabrication.

For a better understanding of the present invention, and to show how the same may be carried into effect, reference will now be made, by way of example, to the accompanying drawings, in which.

Figure 8:
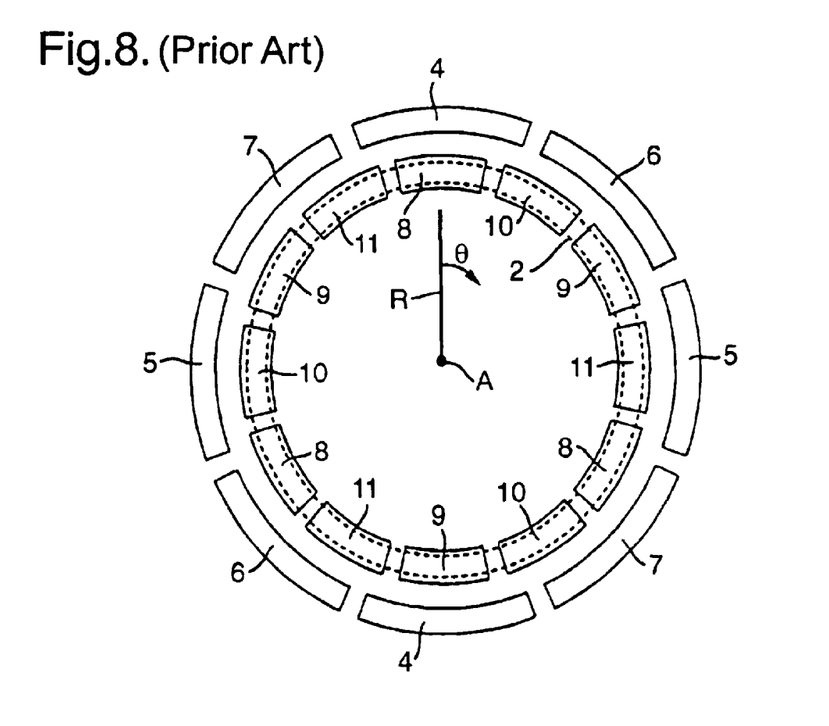
FIG. 8 shows in plan view a three axis rate sensor of the prior art.

FIG. 8 of the accompanying drawings shows a plan a sensor for sensing applied rate on three axes. This known sensor is described by way of example only, and it should be understood that other arrangements could be used in accordance with the present invention.

This example uses a plane sin 2θ/cos 2θ modes in combination with out of plane sin 3θ/cos 3θ modes. The location of the ring 2 is indicated by the dashed lines. This in-planes Cos 2θ carrier mode is driven into oscillation using drive elements 4 whose effective centres are located at 0° and 180° around the outer periphery of the ring 2 with respect to the fixed reference axis R. For each element, the surface normal to the plane of the ring 2 facing the ring circumferences forms one plate of the capacitor with the facing segment of the ring circumference forming the other plate. The ring 2 is maintained at a fixed potential with respect to the drive elements 4. An oscillating voltage applied to the drive element plates at the carrier mode frequency will generate an electrostatic force setting the ring 2 into oscillation. Pick off elements 5, for the carrier mode located at 90° and 270° with respect to the fixed reference axis R, similarly form capacitors with the facing ring segments and are used to detect the motion of the ring 2 as the capacitor gap varies. Pick off elements 6 located at 45° and 225° with respect to the axis R detect the amplitude of the in-plane Sin 2θ response mode when the gyroscope is rotated around the z-axis. Z axis drive elements 7 located at 135° and 315° with respect to the axis R, may be used to null the mode movement to allow the gyroscope to operate in a forced feedback configuration. When operated in this mode the nulling drive is proportional to the applied rate. This mode of operation provides performance advantages over the open loop mode.

The Cos 3θ out-of-plane response mode providing the x-axis rate sensitivity will have anti-nodes at 0°, 60°, 120°, 180°, 240° and 300° locations, with respect to the a R, around the ring circumference. The sin 3θ y-axis response mode will have anti-nodes at 30°, 90°, 150°, 210°, 270° and 330° with respect to the axis R. Drive and pick off elements may be located at any appropriate combinations adjacent to these points. Conveniently, twelve plate like elements are positioned directly under the rim to form capacitors between said plates and the parallel facing segments of the bottom surface of the ring. Conveniently, the plates should extend beyond the inner and outer edges of the ring rim. The in-pane motion of the carrier mode will not therefore change the effective plate area and will not be inadvertently detected by these plate like elements. Elements 8 located at 0°, 120° and 240° are used as x-axis pick off elements. The signals from these elements will be in phase and may be conveniently summed together to give enhanced sensitivity in detecting the mode movement. Plate like elements 9 located at 60, 180° and 300° with respect to the axis R are used as drive elements with the same drive voltage being applied to all these elements to null the motion to facilitate force feedback operation. Similarly, plate like elements 10 located at 30°, 150° and 270° with respect to the axis R are the y-axis pick off elements with plate like elements 11 located at 90°, 210° and 330°, with respect to the axis R forming the drive elements for that mode.

Figure 9:
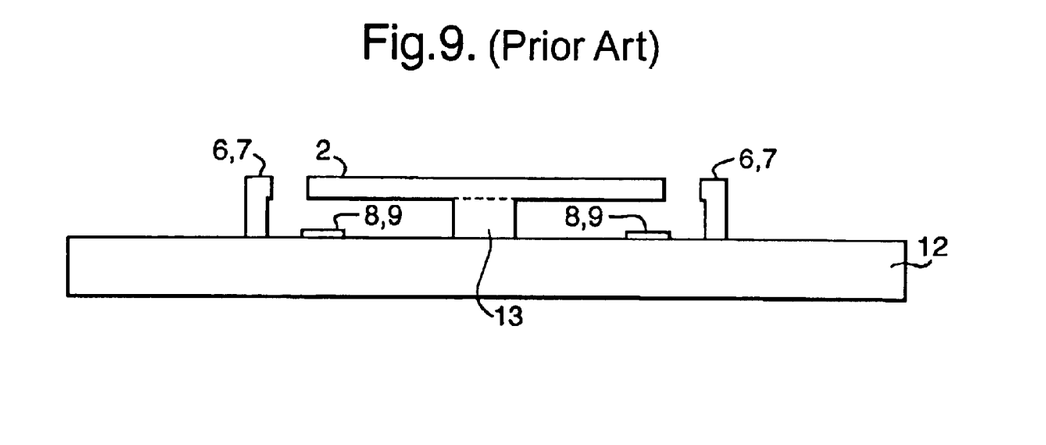
FIG. 9 shows a cross-sectional view of the sensor of FIG. 8.

FIG. 9 shows a cross-section view through FIG. 8 and through the centre of the resonator ring 2 along the y-axis showing additional detail of the device architecture. The x and y-axis drive and pick off elements are conductive sites laid onto the surface of an electrically insulating substrate layer 12. These element sites are connected via tracks to bond pads (not shown) which can be electrically connected to the control circuitry. The ring 2 is attached, via the support legs 3, to a central support pedestal. 13. This pedestal extends beneath the ring 2 and attaches rigidly to the substrate layer 12 such that the ring and support legs are freely suspended above the substrate layer. The in-plane mode drives and pick off elements are rigidly attached to the substrate or base 12 with tracking and bond pads provide as required to enable connection to the control circuitry.

Modifications to this structure are possible. The addition of a second insulating substrate layer rigidly fixed above the resonator ring 2, duplicating the out-of-plane drive and pick off element capacitor plate array, would enhance the sensitivity of the gyroscope along the x and y axes. This would, however, complicate the fabrication process and would not alter the essential design features or functionality of the gyroscope.

Figure 10:
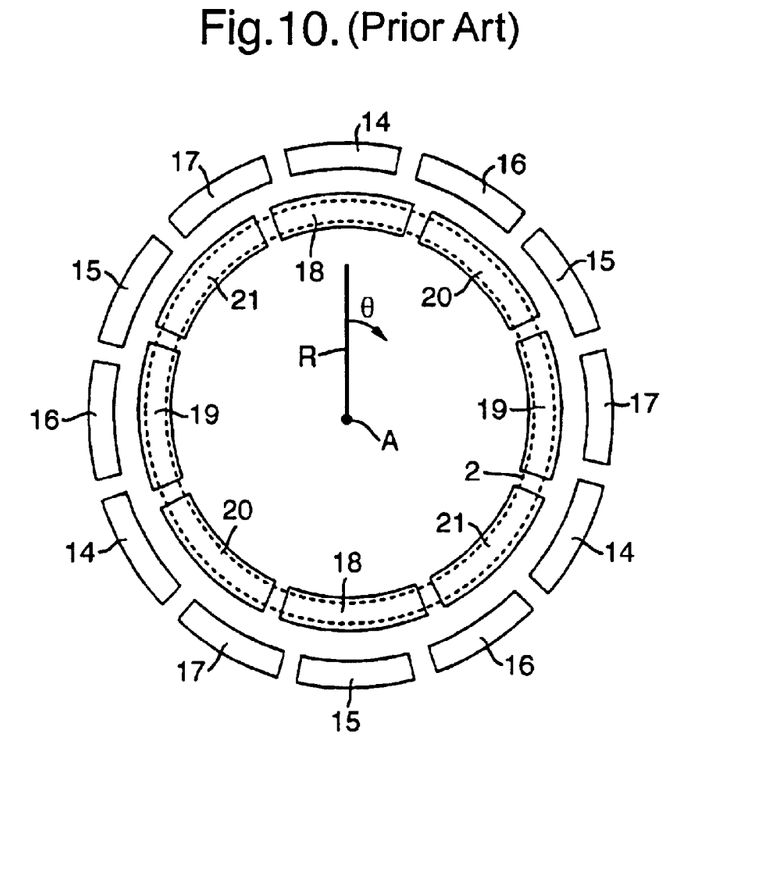
FIG. 10 shows in plan view an alternative three axis sensor of the prior art.

A known three axis gyroscope may be fabricated using Sin 3θ and Cos 3θ in-plane modes in conjunction with Sin 2θ and Cos 2θ out-of-plane response modes. For this embodiment the degeneracy of both the in-plane Sin 3θ and Cos 3θ and out-of-plane Sin 2θ and Cos 2θ mode pairs must be maintained. A schematic of the orientation of the drive and pickoff elements is shown in FIG. 10. The topology of the gyroscope is largely identical to the previously described examples with the exception of the drive and pick off element layout. the Cos 3θ in-plane carrier drive means elements 14 are located at 0°, 120° and 240° with respect to the fixed reference axis R with the pick off means elements 15 located at 60°, 180° and 300° with respect to the axis R. The z-axis sin 3θ in-plane response mode drive elements 16 are located at 30°, 150° and 270° with respect to the axis R with the pick off elements 17 at 90°, 210° and 300° with respect to the axis R. The out-of-plane Cos 2θ x-axis response mode pick off elements 18 are located at 0° and 180° with the nulling drive elements 19 at 90° and 270° with respect to the axis R. The y-axis out-of-plane Sin 2θ pick off elements 20 are located at 45° and 225° with respect to the axis R with the nulling y-axis drive elements 21 at 135° and 315° with respect to the axis R.

Figure 2A:
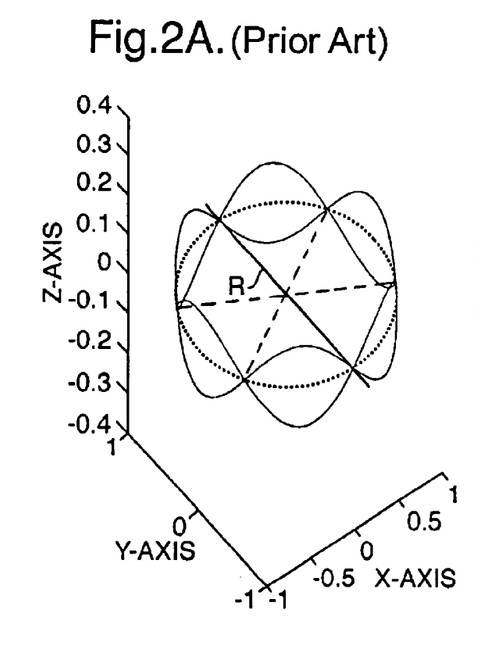
FIGS. 2A and 2B show out of plane sin 3θ and cos 3θ modes.
Figure 2B:
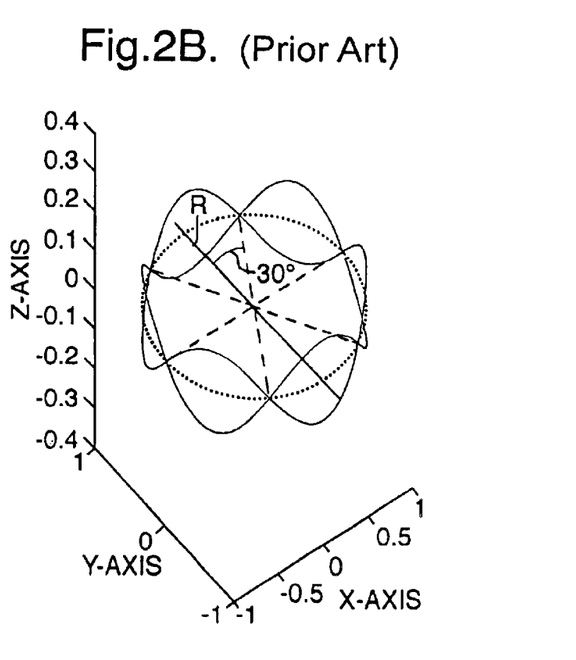

For a three axis gyroscope, a pair of in plane cos 2θ/sin 2θ vibration modes, as shown in FIGS. 1A and 1B, is used in combination with a degenerate pair of out of plane sin 3θ/cos 3θ vibration modes, as shown in FIGS. 2A and 2B. The in plane cos 2θ mode acts as the primary carrier mode which is typically maintained at a fixed vibration amplitude. When the device is rotated about the axis normal to the plane of the ring (z-axis), Coriolis forces are induced which couple energy into the complimentary in plane sin 2θ response mode. When the device is rotated about the y-axis in the plane of the ring, Coriolis forces are induced which couple energy into the out of plane cos 3θ response mode. When the device is rotated about the x-axis in the plane of the ring, Coriolis forces are induced which couple energy into the out of plane sin 3θ response mode. The amplitude of the induced response mode motions is directly proportional to the applied rotation rates about the appropriate input axes.

A detailed analysis of the dynamics of the ring including the effects of the leg motion has enabled simple formulae to be developed which prescribe the range of options available in terms of the number of substantially evenly spaced support legs required to maintain frequency matching of the desired vibration mode pairs.

The analysis indicates that the requirement on the number of legs is far less restrictive than previously indicated. Simple formulae have been derived indicating which modes will have their frequency split for a given number of evenly spaced support legs. These formulae are applicable to both in plane and out of plane modes and are valid for L<2. If L=2 then all modes will be split. For an even number of legs, L, frequency splitting for a mode of order N will only occur when the following condition is met:

$$N = \frac{LK}{2}$$

where K is an integer. Maximum frequency splitting occurs when K=1 and reduces as K is increased. If the number of legs, L, is odd then frequency splitting will only occur where:

$$N = LK$$

The maximum splitting again occurs for K=1 and decreases as the value of K increases.

Figure 6:
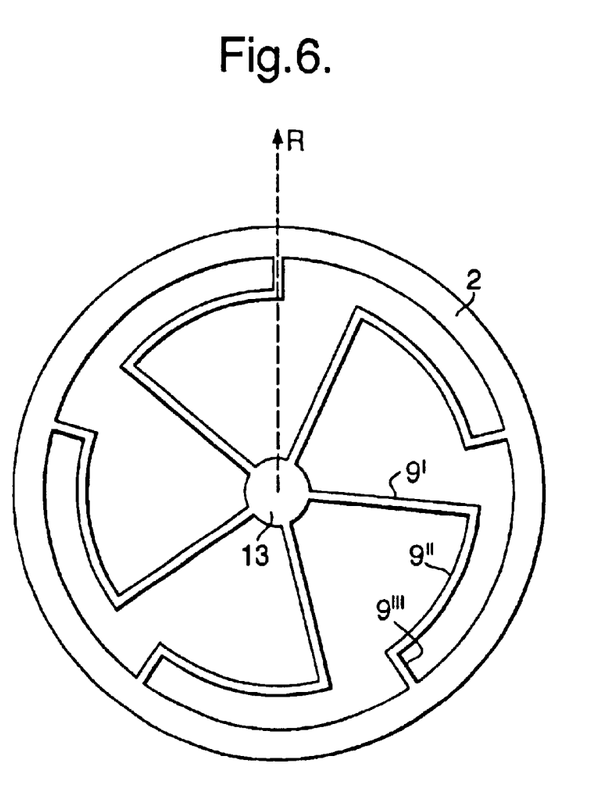
FIG. 6 shows in plan view a resonator having 5 support legs according to the present invention.
Figure 7:
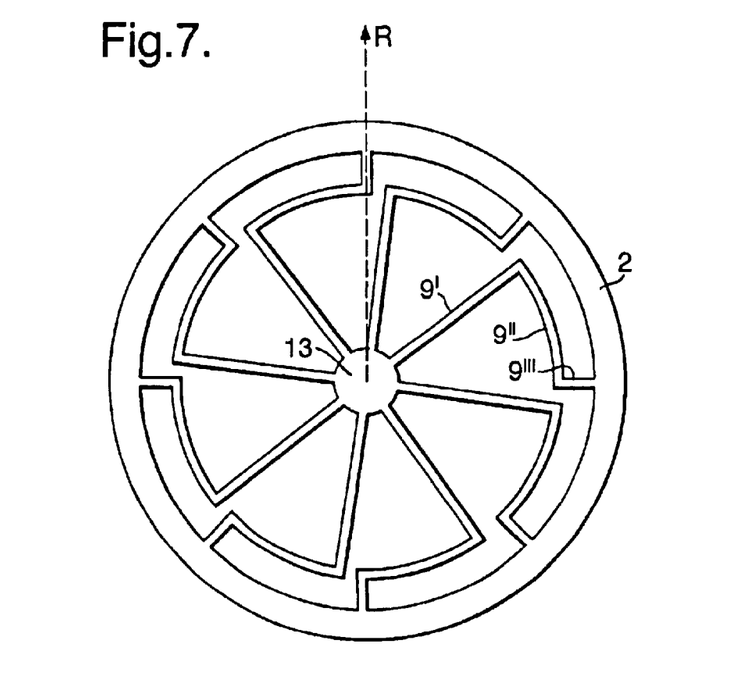
FIG. 7 shows a plan view a resonator having 7 support legs according to the present invention.

These principles may be applied to resonator designs, as described here, using either in plane sin 2θ/cos 2θ modes in combination with out of plane sin 3θ/cos 3θ and to designs using in plane sin 3θ/cos 3θ in combination with sin 2θ/cos 2θ out o plane modes. This leads to the conclusion that the number of legs for these structures is no longer restricted to 24. Planar resonator structures conforming to the following rules may be constructed:

$$L \neq 2^J \times 3^K$$

where J is a constant of value 0, 1 or 2 and K is a constant of value 0, or 1 and L<24. The legs should be equi-angularly spaced. Support structures consisting of 5 legs at 72°, 7 legs at 51.4° etc., of the invention as shown in FIGS. 6 and 7, which preserve the required mode frequency matching for the in and out of plane modes, may therefore be utilised. While it is possible to use higher numbers of support legs using a reduced number is advantageous for the reasons discussed above.

The support leg structures show in FIGS. 6 & 7 are only feasible when using a reduced number of support legs. These structures consist of a straight radial segment 9' extending outwards from the central boss 13, a second straight segment 9''' extending inwards from the inner periphery of the ring but radilly displaced from the first segment. These two segments are connected by an arcuate segment 9" such that the three segments are integrally formed. The in plane radial stiffness of the resonator structure is largely determined by the arcuate segment 9". The in plane tangential stiffness is largely determined by the straight segments 9' & 9'". All segments play a part in determining the out of plane stiffness. Where large number of legs are required the length of the arcuate segment 9" is severely restricted by the proximity of the adjacent legs. Maintaining the in plane radial compliance for is therefore not possible with these leg structures unless the number of support legs is much less than 24. This leg design is well known in the prior art.

In all resonator designs the combined stiffness of the support legs is required to be less than that of the ring. This ensures that the modal vibration is dominated by the ring structure and helps to isolate the resonator from the effects of thermally induced stresses coupling in via the hub 13 of the structure, which will adversely affect performance. When employing fewer support legs the required leg to ring compliance ratio may be maintained by using longer support leg structures of increased width. This renders these structures less susceptible to the effects of dimensional tolerancing errors arising during the fabrication process. Such errors induce frequency splitting between the cos 2θ/sin 2θ and cos θ/sin θ mode pairs which are detrimental to the sensor performance. These typically necessitate the use of mechanical trimming procedures to achieve the desired performance levels. Reducing the requirement for this trimming procedure is therefore highly desirable in terms of cost and fabrication time.

What is claimed is:

1. A three axis sensor including a substantially planar vibratory resonator (2) having a substantially ring or hoop like structure with inner and outer peripheries extending around a common axis (R), drive means (4) for causing the resonator (2) to vibrate in an in plane cos 2θ vibration mode, carrier mode pick-off means (5) for sensing movement of the resonator (2) in response to said drive means (4), pick-off means (6) for sensing in plane sin 2θ resonator motion induced by rotation about the z-axis, drive means (7) for nulling said motion, pick-off means (8) for sensing out of plane sin 3θ resonator motion induced by rotation about the x-axis, drive means (9) for nulling said motion, pick-off means (10) for sensing out of plane cos 3θ resonator motion induced by rotation about the y-axis, drive means (11) for nulling said motion, and support means (3) for flexibly supporting the resonator (2) and for allowing the resonator to vibrate relative to the support means (3) in response to the drive means and to applied rotation, characterised in that the support means (3) comprises only L support beams, where L≠$2^J$×$3^K$ and J=0, 1 or 2 and K=0 or 1 with L<24.

2. A rate sensor according to claim 1, wherein each support means (3) is a beam comprising first and second linear portions ($9^1$, $9^{111}$) extending from opposite ends of an arcuate portion ($9^{11}$).

3. A rate sensor according to claim 2, wherein the support beams are substantially equi-angularly spaced.

4. A rate sensor according to claims 3, wherein the support means (3) includes a base having a projecting boss (13), with the inner periphery of the substantially ring or hoop-like structure being coupled to the boss (13) by the support beams which extend from said inner periphery of the ring or hoop like structure to the projecting boss (13) so that the ring or hoop-like structure of the resonator (2) is spaced from a base (12).

5. A rate sensor according to claim 3 wherein the total stiffness of the support means is less than that of the ring or hoop-like structure of the resonator (2).

6. A rate sensor according to claim 2, wherein the support means (3) includes a base having a projecting boss (13), with the inner periphery of the substantially ring or hoop-like structure being coupled to the boss (13) by the support beams which extend from said inner periphery of the ring or hoop like structure to the projecting boss (13) so that the ring or hoop-like structure of the resonator (2) is spaced from a base (12).

7. A rate sensor according to claim 2 wherein the total stiffness of the support means is less than that of the ring or hoop-like structure of the resonator (2).

8. A rate sensor according to claim 1 wherein the support means (3) includes a base having a projecting boss (13), with the inner periphery of the substantially ring or hoop-like structure being coupled to the boss (13) by the support beams which extend from said inner periphery of the ring or hoop like structure to the projecting boss (13) so that the ring or hoop-like structure of the resonator (2) is spaced from a base (12).

9. A rate sensor according to claim 8 wherein the total stiffness of the support means is less than that of the ring or hoop-like structure of the resonator (2).

10. A rate sensor according to claim 1 wherein the total stiffness of the support means is less than that of the ring or hoop-like structure of the resonator (2).

11. A three axis sensor including a substantially planar vibratory resonator (2) having a substantially ring or hoop like structure with inner and outer peripheries extending around a common axis (R), drive means (14) for causing the resonator (2) to vibrate in an in plane cos 3θ vibration mode, carrier mode pick-off means (15) for sensing movement of the resonator (2) in response to said drive means (14), pick-off means (17) for sensing in plane sin 3θ resonator motion induced by rotation about the z-axis, drive means (16) for nulling said motion, pick-off means (18) for sensing out of plane cos 2θ resonator motion induced by rotation about the y-axis, drive means (19) for nulling said motion, pick off means (20) for sensing out of plane Sin 2θ resonator motion induced by rotation around the x-axis, drive means (21) for nulling said motion, and support means for flexibly supporting the resonator and for allowing the resonator to vibrate relative to the support means in response to the drive means and to applied rotations, characterised in that the support means (3) comprises only L support beams, where L≠$2^J$×$3^K$ and J=0, 1 or 2 and K=0 or 1 with L<24.

12. A rate sensor according to claim 11, wherein each support means (3) is a beam comprising first and second linear portions ($9^1$, $9^{111}$) extending from opposite ends of an arcuate portion ($9^{11}$).

13. A rate sensor according to claim 12, wherein the support beams are substantially equi-angularly spaced.

14. A rate sensor according to claim 13, wherein the support means (3) includes a base having a projecting boss (13), with the inner periphery of the substantially ring or hoop-like structure being coupled to the boss (13) by the support beams which extend from said inner periphery of the ring or hoop like structure to the projecting boss (13) so that the ring or hoop-like structure of the resonator (2) is spaced from a base (12).

15. A rate sensor according to claim 13 wherein the total stiffness of the support means is less than that of the ring or hoop-like structure of the resonator (2).

16. A rate sensor according to claim 12, wherein the support means (3) includes a base having a projecting boss (13), with the inner periphery of the substantially ring or hoop-like structure being coupled to the boss (13) by the support beams which extend from said inner periphery of the ring or hoop like structure to the projecting boss (13) so that the ring or hoop-like structure of the resonator (2) is spaced from a base (12).

17. A rate sensor according to claim 12 wherein the total stiffness of the support means is less than that of the ring or hoop-like structure of the resonator (2).

18. A rate sensor according to claim 11, wherein the support means (3) includes a base having a projecting boss (13), with the inner periphery of the substantially ring or hoop-like structure being coupled to the boss (13) by the support beams which extend from said inner periphery of the ring or hoop like structure to the projecting boss (13) so that the ring or hoop-like structure of the resonator (2) is spaced from a base (12).

19. A rate sensor according to claim 18 wherein the total stiffness of the support means is less than that of the ring or hoop-like structure of the resonator (2).

20. A rate sensor according to claim 11 wherein the total stiffness of the support means is less than that of the ring or hoop-like structure of the resonator (2).

* * * * *

UNITED STATES PATENT AND TRADEMARK OFFICE
CERTIFICATE OF CORRECTION

PATENT NO.        : 6,848,305 B2                                                  Page 1 of 1
APPLICATION NO. : 10/475562
DATED             : February 1, 2005
INVENTOR(S)       : Fell et al.

It is certified that error appears in the above-identified patent and that said Letters Patent is hereby corrected as shown below:

Column 7, line 41, "sin 3$\theta$" should read --cos 3$\theta$--.

Column 7, line 43, "cos 3$\theta$" should read --sin 3$\theta$--.

Column 8, line 36, "cos 2$\theta$" should read --sin 2$\theta$--.

Column 8, line 38, "sin 2$\theta$" should read --cos 2$\theta$--.

Signed and Sealed this

Twenty-seventh Day of November, 2007

JON W. DUDAS
*Director of the United States Patent and Trademark Office*